US007407009B2

(12) United States Patent
Santra et al.

(10) Patent No.: US 7,407,009 B2
(45) Date of Patent: Aug. 5, 2008

(54) METHODS OF USING CEMENT COMPOSITIONS COMPRISING PHOSPHATE COMPOUNDS IN SUBTERRANEAN FORMATIONS

(75) Inventors: Ashok K. Santra, Duncan, OK (US); Ronald J. Crook, Duncan, OK (US); Bobby J. King, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 299 days.

(21) Appl. No.: 11/014,547

(22) Filed: Dec. 16, 2004

(65) Prior Publication Data

US 2006/0131019 A1 Jun. 22, 2006

(51) Int. Cl.
*E21B 33/138* (2006.01)

(52) U.S. Cl. ...................................... 166/293; 166/300

(58) Field of Classification Search ....................... None
See application file for complete search history.

(56) References Cited

U.S. PATENT DOCUMENTS 3,448,800 A 6/1969 Parker et al. ................ 166/294
4,083,407 A 4/1978 Griffin et al. ................ 166/291
5,113,943 A 5/1992 Wilson et al. ............... 166/291
5,301,752 A 4/1994 Cowan et al. ............... 166/292
5,307,876 A 5/1994 Cowan et al. ............... 166/293
5,311,945 A 5/1994 Cowan et al. ............... 166/292
5,314,022 A 5/1994 Cowan et al. ............... 166/293
5,314,031 A 5/1994 Hale et al. ..................... 175/61
5,322,124 A 6/1994 Cowan et al. ............... 166/295
5,325,922 A 7/1994 Cowan et al. ............... 166/293
5,339,913 A 8/1994 Rives .......................... 175/73
5,343,947 A 9/1994 Cowan et al. ............... 166/250
5,343,950 A 9/1994 Hale et al. .................. 166/293
5,343,952 A 9/1994 Cowan et al. ............... 166/295
5,343,968 A 9/1994 Glowka ...................... 175/131
5,368,103 A 11/1994 Heathman et al. ........... 166/289
5,379,843 A 1/1995 Unger et al. ................ 166/295
5,409,071 A * 4/1995 Wellington et al. ...... 166/253.1
5,488,991 A * 2/1996 Cowan et al. ............... 166/293
5,518,541 A 5/1996 Fogel et al. ................. 106/691
5,566,757 A 10/1996 Carpenter et al. ........... 166/285
5,826,662 A 10/1998 Beck et al. .................. 166/387
6,204,214 B1 3/2001 Singh et al. ................. 501/155
6,343,650 B1 2/2002 Ringgenberg .......... 166/250.17
6,561,269 B1 5/2003 Brown et al.
2003/0150614 A1 8/2003 Brown et al.
2005/0263285 A1 12/2005 Santra et al.

OTHER PUBLICATIONS

Heathman, et al., "Quality Management Alliance Eliminates Plug Failures," Society of Petroleum Engineers, SPE 28321, Sep. 25-28, 1994.
Calbert, et al., "Plug Cementing: Horizontal to Vertical Conditions," Society of Petroleum Engineers, SPE 30514, Oct. 22-25, 1995.
James Heathman, "Advances in Cement-Plug Procedures," Journal of Petroleum Technology, pp. 825-831, Sep. 1996.
L.A. Giangiacomo, "A Review of New Multilateral Technology at the Rocky Mountain Oilfield Testing Center," 9th International Conference on Horizontal Technology and Applications, Aug. 25-27, 1997.
Halliburton Brochure, "FLEXPLUG® Service".
Foreign communication from a related counterpart application dated Apr. 13, 2006.

* cited by examiner

*Primary Examiner*—Zakiya W. Bates
(74) *Attorney, Agent, or Firm*—Craig W. Roddy; Baker Botts LLP.

(57) ABSTRACT

Methods of using cement compositions comprising phosphate compounds in subterranean formations are provided. An example of a method is a method of cementing in a subterranean formation. Other examples of methods include methods of avoiding the loss of circulation in a subterranean formation. Other examples of methods include methods of drilling in a subterranean formation.

27 Claims, No Drawings

METHODS OF USING CEMENT COMPOSITIONS COMPRISING PHOSPHATE COMPOUNDS IN SUBTERRANEAN FORMATIONS

BACKGROUND

The present invention relates to subterranean well cementing operations, and more particularly, to methods of using cement compositions comprising phosphate compounds in subterranean formations.

Hydraulic cement compositions commonly are utilized in subterranean operations, particularly subterranean well completion and remedial operations. For example, hydraulic cement compositions are used in primary cementing operations whereby pipe strings, such as casing and liners, are cemented in well bores. In performing primary cementing, a hydraulic cement composition is pumped into an annular space between the walls of a well bore and the exterior surface of the pipe string disposed therein. The cement composition sets in the annular space, thereby forming therein an annular sheath of hardened, substantially impermeable cement that supports and positions the pipe string in the well bore and bonds the exterior surface of the pipe string to the walls of the well bore. Hydraulic cement compositions also are used in remedial cementing operations, such as plugging highly permeable zones or fractures in well bores, plugging cracks and holes in pipe strings, and the like.

Conventional well completion operations commonly involve a period of time wherein subsequent operations (e.g., casing perforation operations, stimulation operations, and the like) may be delayed in order to permit the cement composition to set, and develop sufficient compressive strength in the subterranean formation to permit further drilling to be performed. These time periods may be referred to as "waiting-on-cement time" or "WOC time." Given the high cost to place a drilling rig or workover rig on a job site, excessive WOC time may increase the cost of performing subterranean operations dramatically on a particular well.

Conventional attempts to reduce WOC time commonly have involved the use of magnesium phosphate cement compositions, which are known to set relatively rapidly. However, in some cases conventional magnesium phosphate cement compositions may set so rapidly that a retarder must be included to permit pumping of the magnesium phosphate cement composition to its desired location in a subterranean formation. Though the inclusion of a retarder in the magnesium phosphate cement composition may be suitable in certain circumstances, such retarders often fail to retard the setting of the magnesium phosphate cement compositions at temperatures of about 200° F. and above.

SUMMARY

The present invention relates to subterranean well cementing operations, and more particularly, to methods of using cement compositions comprising phosphate compounds in subterranean formations.

An example of a method of the present invention is a method of cementing in a subterranean formation, comprising: providing a first slurry that comprises a metal oxide or hydroxide; providing a second slurry that comprises a phosphate compound and a water source; placing the first and second slurries separately into a subterranean formation; permitting the first and second slurries to contact each other within the subterranean formation such that the metal oxide or hydroxide, the water source, and the phosphate compound react to form a cement composition; and allowing the cement composition to set in the formation.

Another example of a method of the present invention is a method of avoiding the loss of circulation in a subterranean formation, comprising: providing a first slurry that comprises a metal oxide or hydroxide; providing a second slurry that comprises a phosphate compound and a water source; placing the first and second slurries separately into a borehole in the subterranean formation adjacent openings in a region of the subterranean formation in fluid communication with the borehole; contacting the first slurry with the second slurry adjacent the openings; permitting the first slurry and the second slurry to set to form a plug that seals the openings off from the borehole.

Another example of a method of the present invention is a method of avoiding the loss of circulation in a subterranean formation, comprising: providing a cement composition that comprises a metal oxide or hydroxide, a phosphate compound, a set retarder, and a water source; placing the cement composition into a borehole in the subterranean formation adjacent openings in a region of the subterranean formation in fluid communication with the borehole; and permitting the cement composition to set within the subterranean formation adjacent the openings so as to form a plug that seals the openings off from the borehole.

Another example of a method of the present invention is a method drilling in a subterranean formation comprising: using a drilling fluid to drill a portion of a borehole in a subterranean formation; providing a cement composition that comprises a metal oxide or hydroxide, a phosphate compound, a set retarder, and a water source; placing the cement composition into a borehole in the subterranean formation adjacent openings in a region of the subterranean formation in fluid communication with the borehole; permitting the cement composition to set within the subterranean formation adjacent the openings so as to form a plug that seals the openings off from the borehole; and continuing to use the drilling fluid to drill the borehole in the subterranean formation after permitting the cement composition to set within the subterranean formation.

Another example of a method of the present invention is a method of drilling in a subterranean formation comprising: using a drilling fluid to drill a portion of a borehole in a subterranean formation; providing a first slurry that comprises a metal oxide or hydroxide; providing a second slurry that comprises a phosphate compound and a water source; placing the first and second slurries separately into a borehole in the subterranean formation adjacent openings in a region of the subterranean formation in fluid communication with the borehole; contacting the first slurry with the second slurry adjacent the openings; permitting the first slurry and the second slurry to set to form a plug that seals the openings off from the borehole; and continuing to use the drilling fluid to drill the borehole in the subterranean formation after permitting the first slurry and the second slurry to set.

The features and advantages of the present invention will be readily apparent to those skilled in the art upon a reading of the description of the preferred embodiments that follows.

DESCRIPTION

The present invention relates to subterranean well cementing operations, and more particularly, to methods of using cement compositions comprising phosphate compounds in subterranean formations.

Certain embodiments of the methods of the present invention involve the in situ formulation in a subterranean formation of cement compositions comprising a phosphate compound. For example, certain embodiments of the methods of the present invention involve flowing two streams separately into a subterranean formation, then contacting the streams within the formation so as to form therein a cement composition that comprises a phosphate compound. Among other things, certain embodiments of the present invention may facilitate subterranean uses of cement compositions comprising phosphate compounds, inter alia, by reducing or eliminating the possibility of premature solidification of the cement composition (e.g., reducing or eliminating the possibility of solidification of the cement composition before it arrives at a desired location in the formation).

Certain embodiments of the methods of the present invention involve formulating, at the surface, cement compositions that comprise a set retarder and a phosphate compound; certain embodiments of the methods of the present invention subsequently involve placing these cement compositions in a subterranean formation, and permitting the cement compositions to form a plug therein, which may, inter alia, facilitate avoiding the loss of circulation in the formation.

The cement compositions useful in the present invention generally comprise a phosphate compound. These cement compositions may set relatively rapidly, which dramatically may reduce WOC time that may be experienced during well completion operations. Certain embodiments of the cement compositions comprising a phosphate compound that may be useful in the present invention may set within a time in the range of from about 2 minutes to about 24 hours after their formulation. Adding a set retarder may affect the WOC time. Certain embodiments of the cement compositions comprising a phosphate compound may set within a shorter, or longer time after their formulation.

The cement compositions useful in the present invention may be formed by combining a metal oxide or hydroxide compound, a phosphate compound, and a water source. As will be recognized by one of ordinary skill in the art, with the benefit of this disclosure, these components may be combined in any order and thoroughly mixed using equipment such as blenders and mixers. In certain embodiments of the present invention, the components may be mixed at a shear rate in the range of from about 1,500 rpm to about 4,000 rpm. In certain embodiments of the present invention, the phosphate compound, the metal oxide or hydroxide compound, and any other optional additives may be dry mixed together before water is added. An example of a reaction that may occur when a phosphate compound, a metal oxide or hydroxide compound, and a water source are combined is illustrated by EQUATION 1 below:

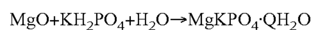

$$MgO+KH_2PO_4+H_2O \rightarrow MgKPO_4 \cdot QH_2O$$

where Q is a number from 1 to 6.

A broad variety of metal oxide or hydroxide compounds may be suitable for use in the present invention. Generally, any metal oxide or hydroxide compound that does not react uncontrollably may be used. Examples of suitable metal oxide or hydroxide compounds include, but are not limited to, MgO, MnO, $Al(OH)_3$, $Al_2O_3$, FeO, $Fe_2O_3$, ZnO, $Zr(OH)_4$, $ZrO_2$, $Y_2O_3$, $La_2O_3$, $VO_3$, CrO, CaO, CoO, PbO, $Nd_2O_3$, TIO, $TiO_2$, $CaSiO_3$, crushed dibasic sodium phosphate crystals mixed with magnesium oxide, and combinations thereof. In certain embodiments of the present invention, magnesium oxide that has been calcined at a temperature greater than or equal to about 3,632° F. may be used. A suitable source of magnesium oxide is commercially available from Halliburton Energy Services, Inc., of Duncan, Okla., under the trade name "MICROBOND HT." Generally, the metal oxide or hydroxide compounds may be present in an amount based on the stoichiometry of the reaction between the metal oxide or hydroxide compound and the phosphate compound. In certain embodiments of the present invention, a metal oxide or hydroxide compound may combined with an oil-based fluid or a synthetic-based fluid and slurried into the subterranean formation. Examples of suitable oil-based fluids include, but are not limited to, canola oil, kerosene, diesel oil, fish oil, mineral oil, sunflower oil, corn oil, soy oil, olive oil, cottonseed oil, peanut oil, paraffin, and the like. Examples of suitable synthetic-based fluids include, but are not limited to, esters (including, inter alia, esters having a $C_2$-$C_{12}$ alcohol portion and a $C_{16}$-$C_{24}$ carboxylic acid portion), olefins (including, inter alia, olefins having a $C_6$-$C_{18}$ linear internal portion), ethers (including, inter alia, ethers having a $C_6$-$C_{24}$ portion), and the like.

A broad variety of phosphate compounds may be suitable for use in the present invention. Generally, a phosphate compound will be used that is water-soluble. Suitable phosphate compounds generally may be represented by the following formula:

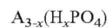

$$A_{3-x}(H_xPO_4)$$

where A may be hydrogen, an alkali metal, or an ammonium ion, and where X may be a number in the range of from about 1 to about 3. In certain embodiments of the present invention, a phosphate compound may be used that comprises at least one of the following: $H_3PO_4$, $(NH_4)_2HPO_4$, $(NH_4)_2H_2PO_4$, $Al(H_2PO_4)_3$, $KH_2PO_4$, $NaH_2PO_4$, or mixtures thereof. Generally, the phosphate compounds may be present in the cement compositions useful with the present invention in an amount based on the stoichiometry of the reaction between the metal oxide or hydroxide compound and the phosphate compound. Additional disclosure pertinent to the use of oxide or hydroxide compounds and phosphate compounds in cement compositions may be found in U.S. Pat. Nos. 3,960,580, 4,756,762, 4,786,328, 6,204,214, and 6,561,269, the relevant disclosures of which are hereby incorporated by reference.

The water source used in the cement compositions useful with the present invention may comprise fresh water, salt water (e.g., water containing one or more salts dissolved therein), brine (e.g., saturated salt water), or seawater. Generally, any water source may be used, provided that it does not contain an excess of compounds (e.g., dissolved organics) that may adversely affect other components in the cement composition. In certain embodiments, the water source may be present in the cement compositions useful with the present invention in an amount in the range of from about 25% to about 40% by weight of the original solids in the cement composition (e.g., the combined weight of the metal oxide or hydroxide plus the phosphate compound). One of ordinary skill in the art, with the benefit of this disclosure, will recognize the appropriate amount of water source to use for a chosen application.

In certain embodiments of the present invention, a set retarder may be included in the cement compositions. Generally, when the cement compositions useful with the present invention are formulated at the surface (e.g., when the metal oxide or hydroxide compound, the water source, and the phosphate compound are combined at the surface before placement in the subterranean formation), a set retarder may be included in the cement composition. In certain embodiments of the present invention wherein the metal oxide or hydroxide compound, the water source, and the phosphate compound are not permitted to react until their placement at a desired location in the subterranean formation, the use of a set retarder may be optional. Suitable set retarders include, inter alia, mixtures of borate compounds and sugars. In certain embodiments of the present invention wherein a mixture of borate compounds and sugars is used as a set retarder, the borate compound may be water-soluble. Examples of suitable borate compounds include, but are not limited to: boric acid; a boric acid salt (e.g., sodium borate); sodium, potassium, lithium, and ammonium pentaborates, tetraborates, octaborates, biborates; and mixtures thereof. Examples of suitable sugars include, but are not limited to, sucrose, lactose, dextrose, and mixtures thereof. In certain embodiments of the present invention wherein a mixture of borate compounds and sugars is used as a set retarder, the borate compound may be present in the cement composition in an amount in the range of from about 0.1% to about 10% by weight of the original solids in the cement composition (e.g., the combined weight of the metal oxide or hydroxide plus the phosphate compound), and the sugars may be present in an amount in the range of from about 0.1% to about 10% by weight of the original solids in the cement composition.

Optionally, additional additives may be added to the cement compositions useful with the present invention as deemed appropriate by one skilled in the art with the benefit of this disclosure. Examples of such additives include, inter alia, fly ash, silica compounds, fluid loss control additives, lost circulation materials, a surfactant, a dispersant, an accelerator, a retarder, a salt, a formation conditioning agent, fumed silica, bentonite, microspheres, expanding additives, weighting materials, organic fibers, and the like. An example of a suitable sodium silicate is commercially available from Halliburton Energy Services, Inc., under the trade name "ECONOLITE®." An example of a suitable additive that demonstrates free-water-reduction and solids-suspension properties is commercially available from Halliburton Energy Services, Inc., of Duncan, Okla., under the trade name "FWCA™." An example of a suitable dispersant is commercially available from Halliburton Energy Services, Inc., under the trade name "CFR-3." An example of a suitable fly ash is an ASTM class F fly ash that is commercially available from Halliburton Energy Services, Inc., under the trade name "POZMIX® A." An example of a suitable silica flour is commercially available from Halliburton Energy Services, Inc., under the trade name "SSA-1." An example of a suitable fumed silica is an aqueous suspension of fumed silica that is commercially available from Halliburton Energy Services, Inc., under the trade name "MICROBLOCK." An example of a suitable foaming surfactant is commercially available from Halliburton Energy Services, Inc., under the trade name "ZONESEAL 3000." An example of a suitable defoamer is commercially available from Halliburton Energy Services, Inc., under the trade name "D-AIR 3000L."

The cement compositions comprising phosphate compounds useful in the present invention may be placed in a subterranean formation in a variety of ways. In certain embodiments of the present invention, a cement composition that comprises a phosphate compound, a metal oxide or hydroxide compound, a water source, and optional additives may be formulated at the surface, and placed in a desired location within the subterranean formation. The cement composition then may be permitted to set therein.

In certain embodiments of the present invention, cement compositions that comprise phosphate compounds may be formed in situ by combining multiple slurries at a desired location in the formation; the cement compositions formed in situ then may be permitted to set in the formation. For example, a slurry comprising a metal oxide or hydroxide dispersed in an oil-based fluid or a synthetic-based fluid could be placed in the formation separately from a slurry comprising a water source and a phosphate compound; the combination of the slurries in the subterranean formation may cause the formation of a cement composition comprising phosphate compounds. In certain embodiments of the present invention, the slurry comprising, e.g., a metal oxide or hydroxide dispersed in an oil-based fluid or a synthetic-based fluid could be placed in the formation separately from, e.g., a slurry comprising a water source and a phosphate compound by sequentially placing the slurries in the formation. In certain other embodiments of the present invention, the slurry comprising, e.g., a metal oxide or hydroxide dispersed in an oil-based fluid or a synthetic-based fluid could be placed in the formation separately from, e.g., a slurry comprising a water source and a phosphate compound by separating the slurries with a spacer fluid, and permitting the slurries to mix at a desired location. In certain other embodiments of the present invention, the slurry comprising, e.g., a metal oxide or hydroxide dispersed in an oil-based fluid or a synthetic-based fluid could be placed in the formation separately from, e.g., a slurry comprising a water source and a phosphate compound by pumping one slurry into the formation through a pipe string, and pumping the other slurry into the formation through an annulus defined by the outer surface of the pipe string and the walls of the well bore.

In certain embodiments of the present invention, cement compositions that comprise phosphate compounds may be used to avoid the loss of circulation in a subterranean formation. For example, during the drilling of a borehole in a subterranean formation comprising a relatively weak portion (e.g., a "thief zone") in fluid communication with the borehole, a cement composition that comprises a water source, a phosphate compound, and a metal oxide or hydroxide (and optional additives) may be pumped through the bore hole to a location adjacent the thief zone, then may set to form a plug therein that may seal the thief zone off from the borehole, thereby preventing further loss of circulation. After the formation of the plug adjacent the thief zone, drilling may be resumed, and a portion of the plug may be drilled through; the remaining portion may continue to seal the thief zone off from the borehole. In certain embodiments of the present invention, the cement composition that comprises a water source, a phosphate compound, and a metal oxide or hydroxide (and optional additives) may be formulated at the surface before being pumped through the bore hole to a location adjacent the thief zone and setting to form a plug therein. In certain other embodiments of the present invention, the cement composition that comprises a water source, a phosphate compound, and a metal oxide or hydroxide (and optional additives) may be placed adjacent the thief zone by pumping the components separately, e.g, by pumping a slurry comprising, e.g., a metal oxide or hydroxide dispersed in an oil-based fluid or a synthetic-based fluid separately from, e.g., a slurry comprising a water source and a phosphate compound, as has been described previously herein.

Therefore, the present invention is well adapted to carry out the objects and attain the ends and advantages mentioned as well as those which are inherent therein. While the invention has been described by reference to certain embodiments of the invention, such a reference does not imply a limitation on the invention, and no such limitation is to be inferred. The invention is capable of considerable modification, alternation, and equivalents in form and function, as will occur to those ordinarily skilled in the pertinent arts and having the benefit of this disclosure. The described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method of cementing in a subterranean formation, comprising:

providing a first slurry that comprises a metal oxide or hydroxide;

providing a second slurry that comprises a phosphate compound and a water source;

sequentially placing the first and second slurries into a portion of a well bore that penetrates a subterranean formation;

permitting the first and second slurries to contact each other within the subterranean formation such that the metal oxide or hydroxide, the water source, and the phosphate compound react to form a cement composition; and allowing the cement composition to set in the formation and at least partially bond the walls of the well bore to the exterior surface of a pipe string disposed in the well bore.

2. The method of claim 1, wherein the first slurry further comprises an oil-based fluid.

3. The method of claim 1, wherein the first slurry further comprises a synthetic-based fluid.

4. The method of claim 1, wherein sequentially placing the first and second slurries into a portion of a subterranean formation comprises separating the first slurry from the second slurry with a spacer fluid.

5. The method of claim 1, wherein the phosphate compound has the formula $$A_{3-x}(H_xPO_4),$$

where A comprises hydrogen, an alkali metal, or an ammonium ion, and where X is from about 1 to about 3.

6. The method of claim 1, wherein the metal oxide or hydroxide comprises magnesium oxide.

7. The method of claim 1, wherein sequentially placing the first and second slurries into a portion of a subterranean formation comprises placing the first slurry into the portion of the subterranean formation and thereafter placing the second slurry into the portion of the subterranean formation.

8. The method of claim 1, wherein sequentially placing the first and second slurries into a portion of a subterranean formation comprises placing the second slurry into the portion of the subterranean formation and thereafter placing the first slurry into the portion of the subterranean formation.

9. A method of avoiding the loss of circulation in a subterranean formation, comprising:

providing a first slurry that comprises a metal oxide or hydroxide;

providing a second slurry that comprises a phosphate compound and a water source;

temporarily suspending the drilling of a borehole in a subterranean formation;

during the temporary suspension of drilling, sequentially placing the first and second slurries into a portion of the borehole in the subterranean formation adjacent openings in the subterranean formation in fluid communication with the borehole;

contacting the first slurry with the second slurry adjacent the openings;

permitting the first slurry and the second slurry to set to form a plug that seals the openings off from the borehole; and resuming drilling.

10. The method of claim 9, wherein the first slurry further comprises an oil-based fluid.

11. The method of claim 9, wherein the first slurry further comprises a synthetic-based fluid.

12. The method of claim 9, wherein sequentially placing the first and second slurries into a portion of a borehole in a subterranean formation comprises separating the first slurry from the second slurry with a spacer fluid.

13. The method of claim 9, wherein the phosphate compound has the formula $$A_{3-x}(H_xPO_4)$$

where A comprises hydrogen, an alkali metal, or an ammonium ion, and where X is from about 1 to about 3.

14. The method of claim 9, wherein the metal oxide or hydroxide comprises magnesium oxide.

15. The method of claim 9, wherein sequentially placing the first and second slurries into a portion of a borehole in a subterranean formation comprises placing the first slurry into the portion of the borehole and thereafter placing the second slurry into the portion of the borehole.

16. The method of claim 9, wherein sequentially placing the first and second slurries into a portion of a borehole in a subterranean formation comprises placing the second slurry into the portion of the borehole and thereafter placing the first slurry into the portion of the borehole.

17. A method of avoiding the loss of circulation in a subterranean formation, comprising:

providing a cement composition that comprises a metal oxide or hydroxide, a phosphate compound, a set retarder that comprises a sugar and a borate compound, and a water source;

temporarily suspending the drilling of a borehole in a subterranean formation;

during the temporary suspension of drilling, placing the cement composition into a portion of the borehole in the subterranean formation adjacent openings in a region of the subterranean formation in fluid communication with the borehole;

permitting the cement composition to set within the subterranean formation adjacent the openings so as to form a plug that seals the openings off from the borehole; and resuming drilling.

18. The method of claim 17 wherein the phosphate compound has the formula $$A_{3-x}(H_xPO_4)$$

where A comprises hydrogen, an alkali metal, or an ammonium, and where X is from about 1 to about 3.

19. The method of claim 17 wherein the metal oxide or hydroxide comprises magnesium oxide.

20. The method of claim 17 wherein the metal oxide or hydroxide comprises magnesium oxide that has been calcined at a temperature greater than or equal to about 3,632° F.

21. A method of cementing in a subterranean formation, comprising:

providing a first slurry that comprises a metal oxide or hydroxide;

providing a second slurry that comprises a phosphate compound and a water source;

placing the first and second slurries separately into a portion of a well bore that penetrates a subterranean formation by separating the first slurry from the second slurry with a spacer fluid;

permitting the first and second slurries to contact each other within the subterranean formation such that the metal oxide or hydroxide, the water source, and the phosphate compound react to form a cement composition; and allowing the cement composition to set in the formation and at least partially bond the walls of the well bore to the exterior surface of a pipe string disposed in the well bore.

22. The method of claim 21, wherein the first slurry further comprises an oil-based fluid.

23. The method of claim 21, wherein the first slurry further comprises a synthetic-based fluid.

24. The method of claim 21, wherein the phosphate compound has the formula $$A_{3-x}(H_xPO_4),$$

where A comprises hydrogen, an alkali metal, or an ammonium ion, and where X is from about 1 to about 3.

25. The method of claim 21, wherein the metal oxide or hydroxide comprises magnesium oxide.

26. A method of servicing a subterranean formation, comprising:

providing a first slurry that comprises a metal oxide or hydroxide dispersed in a fluid that comprises at least one fluid selected from the group consisting of an oil-based or a synthetic-based fluid;

providing a second slurry that comprises a phosphate compound and a water source;

placing the first and second slurries separately into a subterranean formation, wherein either the first or second slurry is introduced through a pipe string disposed in a well bore and the other slurry is introduced through an annulus defined by the outer surface of the pipe string and the walls of the well bore;

permitting the first and second slurries to contact each other within the subterranean formation such that the metal oxide or hydroxide, the water source, and the phosphate compound react to form a cement composition; and allowing the cement composition to set in the formation.

27. The method of claim 26, wherein the phosphate compound has the formula $$A_{3-x}(H_xPO_4),$$

where A comprises hydrogen, an alkali metal, or an ammonium ion, and where X is from about 1 to about 3.

* * * * *